(12) United States Patent
Grover et al.

(10) Patent No.: US 7,719,962 B2
(45) Date of Patent: May 18, 2010

(54) DESIGN OF A META-MESH OF CHAIN SUB-NETWORKS

(75) Inventors: Wayne D. Grover, Edmonton (CA); John Doucette, Edmonton (CA)

(73) Assignee: Telecommunications Research Laboratories, Edmonton (CA)

(*) Notice: Subject to any disclaimer, the term of this patent is extended or adjusted under 35 U.S.C. 154(b) by 1477 days.

(21) Appl. No.: 10/000,715

(22) Filed: Oct. 19, 2001

(65) Prior Publication Data
US 2002/0071392 A1      Jun. 13, 2002

Related U.S. Application Data

(60) Provisional application No. 60/242,709, filed on Oct. 25, 2000.

(51) Int. Cl.
*H04L 12/26* (2006.01)

(52) U.S. Cl. .................. 370/229; 370/242; 370/248; 370/249

(58) Field of Classification Search ......... 370/216–218, 370/221–225, 228, 241–242, 244, 248–249, 370/250, 252; 709/239; 714/2, 100, 1, 3, 714/4, 40, 43
See application file for complete search history.

(56) References Cited

U.S. PATENT DOCUMENTS 5,146,452 A * 9/1992 Pekarske ................. 370/228
5,835,482 A * 11/1998 Allen .......................... 370/225

(Continued)

OTHER PUBLICATIONS

A photocopy of Canadian Patent Application No. 2,161,847, filed Oct. 31, 1995 (published May 1, 1997), including drawings and filing certificate, 32 pages.

(Continued)

*Primary Examiner*—Aung S Moe
*Assistant Examiner*—Feben Haile
(74) *Attorney, Agent, or Firm*—Christensen O'Connor Johnson Kindness PLLC

(57) ABSTRACT

A method to increase the capacity efficiency of span-restorable mesh networking on sparse facility graphs. The new approach views the network as a "meta-mesh of chain sub-networks". This makes the prospect of WDM mesh networking more economically viable than with previous mesh-based design where the average nodal degree is low. The meta-mesh graph is a homeomorphism of the complete network in which edges are either direct spans or chains of degree-2 nodes. The main advantage is that loop-back type spare capacity is provided only for the working demands that originate or terminate in a chain, not for the entire flow that crosses chains. The latter "express" flows are entirely mesh-protected within the meta-mesh graph which is of higher average degree and hence efficiency for mesh restoration, than the network as a whole. Nodal equipment savings also arise from the grooming of express lightpaths onto the logical chain-bypass span. Only the meta-mesh nodes need optical cross-connect functionality. Other sites use OADMs and/or glassthroughs. The resultant designs comprise a special class of restorable network that is intermediate between pure span restoration and path restoration. Most of the efficiency of path restoration is achieved, but with a span restoration mechanism which is more localized and potentially faster and simpler than path restoration. The concept lends itself to implementation with OADMs having a passive waveband pass-through feature to support the logical chain bypass spans for express lightpaths.

14 Claims, 7 Drawing Sheets

U.S. PATENT DOCUMENTS

| | | | | |
|---|---|---|---|---|
| 5,850,505 | A | 12/1998 | Grover et al. | 395/182.02 |
| 6,137,775 | A * | 10/2000 | Bartlett et al. | 370/216 |
| 6,278,689 | B1 * | 8/2001 | Afferton et al. | 370/223 |
| 6,282,170 | B1 * | 8/2001 | Bentall et al. | 370/225 |
| 6,377,543 | B1 | 4/2002 | Grover et al. | 370/227 |
| 6,507,561 | B1 * | 1/2003 | Baniewicz et al. | 370/216 |
| 6,744,727 | B2 * | 6/2004 | Liu et al. | 370/228 |
| 6,795,394 | B1 * | 9/2004 | Swinkels et al. | 370/222 |
| 6,842,723 | B2 * | 1/2005 | Alicherry et al. | 703/2 |
| 2004/0073700 | A1 * | 4/2004 | Chaudhuri | 709/239 |

OTHER PUBLICATIONS

A photocopy of Canadian Patent Application No. 2,212,933, filed Aug. 13, 1997 (published Feb. 13, 1999), including drawings and filing certificate, 154 pages.

A photocopy of Canadian Patent Application No. 2,210,207, filed Jul. 11, 1997 (published Jan. 11, 1999), including drawings and filing certificate, 93 pages.

A photocopy of Canadian Patent Application No. 2,269,649, filed Apr. 22, 1999 (published Oct. 22, 2000), including drawings and filing certificate, 21 pages.

A photocopy of Canadian Patent Application No. 2,280,981, filed Aug. 27, 1999 (published Apr. 6, 2000), including drawings and filing certificate, 22 pages.

A photocopy of Canadian Patent Application No. 2,285,101, filed Oct. 6, 1999 (published Apr. 8, 2000), including drawings and filing certificate, 38 pages.

A photocopy of Canadian Patent Application No. 2,307,520, filed Apr. 28, 2000 (published Oct. 29, 2000), including drawings and filing certificate, 131 pages.

A photocopy of U.S. Appl. No. 08/893,491, filed Jul. 11, 1997, including drawings and filing certificate, 95 pages.

A photocopy of U.S. Appl. No. 09/314,518, filed May 19, 1999, including drawings and filing certificate, 21 pages.

A photocopy of U.S. Appl. No. 09/167,409, filed Oct. 6, 1998, including drawings and filing certificate, 22 pages.

A photocopy of U.S. Appl. No. 09/414,474, filed Oct. 7, 1999, including drawings and filing certificate, 38 pages.

A photocopy of U.S. Appl. No. 09/561,355, filed Apr. 28, 2000, including drawings and filing certificate, 125 pages.

Biswanath Mukherjee, "WDM Optical Communication Networks: Progress and Challenges," IEEE Journal on Selected Areas in Communications, vol. 18, No. 10, Oct. 2000, pp. 1810-1824.

O. Aboul-Magd et al., "Automatic Switched Optical Network (ASON) Architecture and Its Related Protocols," IETF Internet Draft, draft-ietf-ipo-ason-00.txt, Jul. 2001, 17 pages.

Wayne D. Grover, "Self-Organizing Broad-Band Transport Networks," Proceedings of the IEEE: Special Issue on Communications in the 21st Century, vol. 85, No. 10, Oct. 1997, pp. 1582-1611.

A. Lardies, A. Aguilar, "Planning Methodology for SDH+Optical Networks," Proc. First Int. Workshop on the Design of Reliable Communication Networks (DRCN 1998), Belgium, May 1998, 7 pages.

Bart Van Caenegem et al., "Dimensioning of Survivable WDM Networks," IEEE Journal on Selected Areas in Communications, vol. 16, No. 7, Sep. 1998, pp. 1146-1157.

Matthieu Clouqueur, Wayne D. Grover, "Computational and Design Studies on the Unavailability of Mesh-restorable Networks," IEEE/VDE Design of Reliable Communication Networks (DRCN 2000), Munich, Apr. 2000, pp. 181-186.

Tsong-Ho Wu, Fiber Network Service Survivability, Artech House, Inc., 1992, pp. 1-15, 123-210.

Mari W. Maeda, "Management and Control of Transparent Optical Networks," IEEE Journal on Selected Areas in Communications, vol. 16, No. 17, Sep. 1998, pp. 1008-1023.

Hideki Sakauchi et al., "A Self-Healing Network with an Economical Spare-Channel Assignment," IEEE Globecom '90, 1990, pp. 438-443.

Dr. Wayne Grover, "Distributed Restoration of the Transport Network," Telecommunications Network Management into the 21st Century, Edited by Salah Aidarous and Thomas Plevyak, IEEE Press, Chapter 11, Feb. 1994, pp. 337-417.

W.D. Grover et al., "Near Optimal Spare Capacity Planning in a Mesh Restorable Network," IEEE Globecom '91, 1991, pp. 2007-2012.

Meir Herzberg et al., "The Hop-Limit Approach for Spare-Capacity Assignment in Survivable Networks," IEEE/ACM Transactions on Networking, vol. 3, No. 6, Dec. 1995, pp. 775-784.

Yijun Xiong, Lorne G. Mason, "Restoration Strategies and Spare Capacity Requirements in Self-Healing ATM Networks," IEEE/ACM Transactions on Networking, vol. 7, No. 1, Feb. 1999, pp. 98-110.

Rainer R. Iraschko et al., "Optimal Capacity Placement for Path Restoration in STM or ATM Mesh-Survivable Networks," IEEE/ACM Transactions on Networking, vol. 6, No. 3, Jun. 1998, pp. 325-336.

Y. Zheng et al., "Broadband Network Design with Controlled Exploitation of Flow Convergence Overloads in ATM VP-Based Restoration," Canadian Conference on Broadband Research (CCBR'97), Ottawa, Apr. 16-17, 1997, pp. 172-183.

Robert Doverspike, Brian Wilson, "Comparison of Capacity Efficiency of DCS Network Restoration Routing Techniques," J. Networks and System Management, vol. 2, No. 2, 1994, 27 pages.

John Doucette, Wayne D. Grover, "Influence of Modularity and Economy-of-Scale Effects on Design of Mesh-Restorable DWDM Networks," IEEE Journal on Selected Areas in Communications, vol. 18, No. 10, Oct. 2000, pp. 1912-1923.

Wayne D. Grover, John Doucette, "Increasing the Efficiency of Span-restorable Mesh Networks on Low-connectivity Graphs," 3rd International Workshop on Design of Reliable Communication Networks (DRCN 2001), Budapest, Hungary, Oct. 2001, pp. 99-106.

John Doucette, Wayne D. Grover, "Comparison of Mesh Protection and Restoration Schemes and the Dependency on Graph Connectivity," 3rd International Workshop on Design of Reliable Communication Networks (DRCN 2001), Budapest, Hungary, Oct. 2001, pp. 121-128.

Eytan Modiano, Philip J. Lin, "Traffic Grooming in WDM Networks," IEEE Communications Magazine, Jul. 2001, pp. 124-129.

W.D. Grover, Y. Zheng, "VP-Based ATM Network Design with Controlled Over-Subscription of Restoration Capacity," Proc. 1st Int'l Workshop on Design of Reliable Communication Networks (DRCN '98), Brugge, Belgium, May 1998, paper O.33, 6 pages.

Ryutaro Kawamura et al., "Self-Healing ATM Networks Based on Virtual Path Concept," IEEE Journal on Selected Areas in Communications, vol. 12, No. 1, Jan. 1994, pp. 120-127.

Sriganesh Kini et al., "Shared Backup Label Switched Path Restoration," IETF Internet Draft, draft-kini-restoration-shared-backup-00.txt, Nov. 2000, 10 pages.

Rainer R. Iraschko, Wayne D. Grover, "A Highly Efficient Path-Restoration Protocol for Management of Optical Network Transport Integrity," IEEE Journal on Selected Areas in Communications, vol. 18, No. 5, May 2000, pp. 779-794.

Marco Bettin et al., "Comparison of protection and restoration schemes for SDH networks," Proc. First Int. Workshop on the Design of Reliable Comm. Networks (DRCN 1998), Brugge, Belgium, 1998, 6 pages.

James Ballintine, "A Proposed Implementation for a Digital 'Wrapper' for OCh Overhead," ANSI T1X1.5/99-003, Jan. 1999, http://www.t1.org./index/0816.htm, 6 pages.

D. Anthony Dunn, et al., "Comparison of k-Shortest Paths and Maximum Flow Routing for Network Facility Restoration," IEEE Journal on Selected Areas in Communications, vol. 12, No. 1, Jan. 1994, pp. 88-99.

Meir Herzberg, Stephen J. Bye, "An Optimal Spare-Capacity Assignment Model for Survivable Networks with Hop Limits," IEEE Globecom '94, 1994, 6 pages.

Georgios Ellinas et al., "Protection Cycles in Mesh WDM Networks," IEEE Journal on Selected Areas in Communications, vol. 18, No. 10, Oct. 2000, pp. 1924-1937.

M.H. MacGregor, W.D. Grover, "Optimized k-shortest-paths Algorithm for Facility Restoration," Software—Practice & Experience, vol. 24(9), Sep. 1994, pp. 823-834.

Printout from Global Crossing website: http://www.globalcrossing.com/xml/network/index.xml, printed May 2002, copyright 2002 Global Crossing Holdings Ltd., 2 pages, known to exist before filing of instant application.

Printout from 360 networks website: http://www.360networks.com/Our_Networks.asp, printed May 2002, 1 page, known to exist before filing of instant application.

Printout from Level 3 Communications website: http://www.level3.com/577.html, printed May 2002, copyright 2001 by Level 3 Communications, Inc., 2 pages, known to exist before filing of instant application.

Printout form Genuity website: http://www.genuity.com/infrastructure/maps.htm, printed May 2002, copyright 2002 Genuity Inc., 1 page, known to exist before filing of instant application.

Printout from WorldCom website: http://www1.worldcom.com/global/about/network/maps/, printed May 2002, copyright 2002 WorldCom, 2 pages, known to exist before filing of instant application.

Printout from Williams Communications website: http://www.wcg.com/network/map/index.html, printed May 2002, 1 page, known to exist before filing of instant application.

\* cited by examiner

FIGURE 1 - PRIOR ART

DESIGN OF A META-MESH OF CHAIN SUB-NETWORKS

CROSS-REFERENCE TO RELATED APPLICATIONS

This application claims priority from U.S. provisional application No. 60/242,709 filed Oct. 25, 2000.

BACKGROUND OF THE INVENTION

Developments in DWDM-based switching technology are giving rise to networking elements that are capable of manipulating individual lightwave carriers or wavebands in ways that are logically similar to SONET-era add-drop multiplexers and cross-connects in terms of the agility they provide for reconfiguration of the transport layer. Like SONET elements that add-drop or cross-connect individual STS-1 or STS-n tributaries, Optical ADMs (OADMs) and Optical cross-connects (OCX) can add/drop or cross-connect wavelengths (or wavebands) [1]. All references in square brackets are listed at the end of the disclosure. One advantage of these DWDM networking elements is that they provide the reconfigurability to adapt the logical wavelength connectivity layer to match changing demand patterns in the service layers enabling the concept of an "automatically switched" (a.k.a "self-organizing") transport network (ASTN) [2], [3]. But another advantage is that OADM and OCX elements enable mesh restoration schemes for the optical networking layer.

One driver for optical layer mesh restoration over the ring protection schemes of Sonet is the greater capacity efficiency that can be achieved [11]-[24]. Mesh networking allows routing of the working demands over shortest paths of the facilities graph and greater efficiency in the sharing of spare capacity for restoration. In practice, however, some real networks are so sparse in their facility-route topology that it may still be hard for mesh-based restoration to prove-in over a ring-based solution which is less capacity efficient but is based on less-costly OADMs rather than OCX. The emphasis on "low-connectivity" graphs reflects the reality of several North American Inter-exchange carrier (IXC) networks. While European networks often have $\bar{d}>4$, (see for example the networks in [10], [12]), North American IXC networks can be extremely sparse, with $\bar{d}$ as low as 2.2 (see for example [6]). $\bar{d}$ is the average number of separate facility routes leaving each node.

In a bi-connected network with $\bar{d}$ only slightly above two there will be a preponderance of degree-2 locations and will tend to contain chain sub-networks, like beads of a string. FIG. 1 is a conceptual example of such a sparse facility topology. The example is illustrative only, but to varying extents is characteristic of the North American portions of the networks described at [4] through [10]. At least empirically it is well recognized that North American networks, especially in Canada and over large parts of the mid-U.S.A., tend to be of lower degree than European networks. This is perhaps because, per-unit of geographical area, there have been fewer revenue producing source/sink centers in these regions to justify the historical development of a richer fabric of direct facility routes at the continental scale. And more recently, advances in transmission capacity, and related economy-of-scale in capacity-cost effects, only serve to reinforce the tendency towards sparse facility graphs [25]. With large amounts of capacity and economy of scale it can often be economic to route longer distances, over sparser graphs, rather than seek additional facility routes, at least as a short-term recourse to meeting demand. There is thus a practical reason to be interested in transport network research that is especially focussed on sparse transport graphs. The extent to which ring-based networks have been deployed at the IXC level in North America compared to Europe, is in a sense also a recognition of this sparseness in that rings are easily mapped onto these natural chains. However, rings have to be closed to operate, whereas a set of chain sub-networks may, as proposed herein, be operated at a higher (a meta- level) as a form of mesh-restorable network.

On the other hand, a very sparse graph can make the economic advantage of mesh-based networking questionable. For a few years now informal appraisals have often judged that a network as sparse as in FIG. 1 would be simply too low-degree to benefit enough from mesh restoration (relative to a ring-based status quo). After all, mesh efficiencies can only possibly occur at nodes with d=3 or higher: a d=1 node is not restorable and a d=2 node is already as well served by a shared-protection (BLSR type) ring as it can be. And increasing $\bar{d}$ by simply acquiring more rights-of-way is generally a most long-term and expensive proposition. Right-of-way costs can be one of the single largest investments the network operator faces involving years of legal work to piece together individual purchases, leases, municipal approvals, permits, and so on, to establish one new edge in the facilities graph. An object of this invention, therefore, is to enhance the efficiency of span-restorable mesh networks on low-degree topologies.

Definitions

The most common practical aim in the design of survivable transport networks is to achieve 100% restorability against any single span failure either through network protection or restoration using a designed-in allocation of spare capacity. We use the term spare to denote any such designed-in reserve capacity whether technically for protection or restoration. Generally protection is used for schemes where the spare capacity is reserved and dedicated to cover a specific set of failure scenarios such as in 1+1 diverse-routed protection, or path- or line-switched rings. Restoration refers to arrangements where a network-wide allocation of spare capacity is not dedicated to any specific failure but is configured as needed to restore affected carrier signals as failures arise. Restoration schemes can generally achieve higher sharing of spare capacity than a corresponding protection scheme, but may require a more complex real-time process for the failure recovery.

Designing for 100% restorability means that all of the failed working demand units, in this case traffic-bearing lightwave links forming parts of end-to-end lightpaths, can be restored by replacement paths either end-to-end across the network or through detour-like path segments formed between the end-nodes of the failed span itself. The required replacement paths must be feasible for every single-failure scenario within the environment of spare wavelengths surviving after the failure. An obvious aim in designing any survivable mesh network is therefore to assure that all such restoration path-sets are feasible within a globally minimized total amount of spare capacity. Every span in a mesh-restorable network has a number of working capacity units and a designed-in number of spare-capacity units. In DWDM networking the units of both working and spare capacity are individual DWDM carrier wavelengths. The spare capacity on a span is not, however, for restoration of demands crossing the same span, but is for shared use in restoration routing for other span failures. Spare capacity is in every way identical to working capacity but it bears no actual traffic (or any such traffic is preemptible) when in the standby state. Each spare wavelength is also fully ready for use but is not yet cross-connected into any lightpath in the non-failure state.

The term span as used here has its origin in the transmission networking community to refer to a grouping of physical layer carrier signals between adjacent cross-connecting nodes that can undergo a common-cause failure. As Bhandari [13] explains " . . . spans are the set of physical transmission fibers/cables in the physical facility graph. Links of the logical connectivity graph are built from spans. A given span can thus be common to a number of links." A span is further defined by us as constituting the set of all the physical working and spare channels that terminate on adjacent cross-connecting nodes and share a common exposure to a single physical cut of their infrastructure, such as a duct or cable. Each working capacity unit on a span is thus part of a logical link in a client service-layer network, all such links being destined to fail together if the corresponding physical span fails. A span is thus like the more recent concept of shared link risk group (SLRG). One physical entity failure may also produce one or more simultaneous span cuts if more than one cross-connect adjacency is involved. Notwithstanding the specific meaning of span here, readers are advised that the more generic term link is often also used in this context. The intended meaning of link as either a service-layer or physical-layer entity has to be construed appropriately in each case.

Reversion is the process of returning affected demand flows back to their pre-failure routes from their restoration routes after physical repair of the failed span. In all cases which follow, other than with dedicated 1+1 APS protection, we are designing capacity for networks in which reversion is assumed to occur following a failure and its subsequent repair before there is any significant probability of a second failure onset. Mesh-restorable networks can be designed to sustain a second span failure while repair of the first failure is ongoing but the spare capacity penalty can be very high [14] and this is not generally the aim in the practical design of transport networks. It is, however, assumed that in networks where spare capacity is available for either restoration or new service provisioning, ongoing provisioning of new service paths during the restored state will have to be cognizant of the spare capacity used by the restoration process and provision new service paths accordingly. An alternative, however, is to operate a transport network with an envelope of working capacity, within which self-organizing ASTN-type service provisioning is conducted with a separate allocation of spare capacity for assured restoration of any single span failure within the working envelope. When it is the working envelope itself that is protected, ASTN operations can remain blind to the details of the failure and restoration reconfiguration.

The generic term demand refers to a working unit of aggregated traffic to be transported between origin-destination (O-D) nodes of the network. The term follows Wu's distinction between traffic itself and the demand units [15] required to transport it. Traffic for example is the individual IP packet and or STS-level tributary flows exchanged between O-D pairs. But demand expresses the aggregate requirement of all traffic types for lightpaths between a given O-D pair. One unit of demand consumes one working wavelength on each span traversed on the route of the demand between O and D.

Loop-Back in Restoration Schemes

The simplest form of network protection is diverse-routed 1+1 automatic protection switching (APS) with a dedicated span- (or node-) disjoint protection (DP) path. 1+1 DP APS uses simple terminals but requires over 100% redundancy in terms of total wavelength-kms required. By the redundancy of a span or a network as a whole, we mean the ratio of total spare to total working capacity. Optical path-protection rings (OPPR) and Optical shared protection rings (OSPR) [16] are the WDM-based counterparts to SONET UPSR and BLSR. The OPPR/UPSR structure is a logical collection of tributary-level 1+1 DP setups that is no more architecturally efficient than 1+1 APS, but is economically efficient because of the economy of scale in sharing of the optical line transmission capacity, and because of the relative simplicity of the OADM terminals. The OPSR/BLSR structure is more efficient than 1+1 DP APS or OPPR/UPSR because it uses a line-level loop-back mechanism, allowing sharing of protection capacity over all spans of the same ring. However, the best an OPSR/BLSR ring can do is achieve 100% redundancy because the protection capacity around the entire ring must meet the largest cross-section of working capacity anywhere in the ring.

This 100% matching of spare capacity to largest-working capacity is a general property of any degree-2 sub-network such as a ring or a chain of degree-2 nodes. A ring is just a sub-network of degree-2 nodal elements arranged in a cycle on the graph, while a chain is a connected segment of degree-2 nodes that does not close on itself. Loop-back refers to the mechanism and the spare capacity requirements required for restoration routing in either a BLSR ring, or in a chain under span restoration. The main point to observe is that at any degree-2 site the spare capacity on the "East" side of the node must meet or exceed the working capacity on the "West" side of the same node, and vice-versa. The topology of a ring or chain dictates that to escape from a cut on one-side of a node, the spare capacity on the other side must be sufficient to support loop-back of the failed working capacity on the cut side.

Mesh Restoration and Protection Schemes

Span restoration is the mesh technology equivalent to OPSR and BLSR rings in that restoration occurs by rerouting between the immediate end nodes of the break. Span restoration is like deploying a set of detours around the specific break in a road that disrupts working paths. Unlike rings, however, mesh span restoration need not be via a single route, nor via simple two-hop routes only. By analogy, if a highway has several lanes, there may be an independent detour path deployed for each lane limited by a hop or distance limit, H, which can be considerably more than two hops. The basic re-routing and capacity design methods for span restoration can incorporate a hop or distance limit and/or an optical path loss limit. Setting the hop or distance limit allows a trade-off between the maximum length of restoration paths and the total spare capacity. As H is increased, more sharing-efficient patterns of re-routing are permitted until at a threshold hop limit $H^*$, the theoretical minimum of spare capacity is reached [20].

For comparisons of the restoration system of the present invention to existing schemes, we consider two variants of the span restoration capacity design problem. In the Spare Capacity Assignment (SCA) problem we consider span-restorable networks in which demands are first shortest-path routed followed by optimal spare capacity assignment for 100% restorability. The total spare capacity is minimized independently of working capacity. In Joint Capacity Assignment (JCA) we consider span-restorable networks where the routing of working paths (and hence working capacity) is jointly optimized with spare capacity assignment to minimize total capacity. Self-organizing methods for this type of restoration, including distributed self-planning, are well developed from work in the 1990s [17], [18], and [32]. Although phrased in the language of the times, i.e., SONET, these schemes are fairly easily mapped into DWDM implementations between opto-electronic cross-connects, especially if digital wrapper [36] is implemented. Alternately, centralized control or OSPF-type path finding may be iterated to develop a set of k-shortest replacement paths for this type of restoration.

Shared backup path-protection and path-restorable networks are also considered here. In Shared Backup Path Protection (SBPP) we assume the shortest route is used for the working path and a single fully-disjoint route is selected for the backup path under optimization to permit sharing of spare capacity over all backup paths whose working paths are failure-disjoint. Demands on working paths that follow physically disjoint routes over the network will not need the restoration capacity simultaneously, hence restoration capacity sharing is permitted. This is logically the same scheme as was proposed for ATM Backup VP restoration [30] in the special case where the maximum permissible over-subscription factor [23] is limited to 1.0. The SBPP approach is receiving much attention in recent IETF deliberations [31]. SBPP is sometimes called failure-independent path protection because the route of the backup path is the same regardless of where a failure arises on the corresponding working path. This is argued to simplify activation and speed up cross-connection of the backup path. But it foregoes the opportunity in capacity planning to re-use the surviving "stub" portions of the failed path either for the same working demand or for restoration of any other demands that underwent simultaneous failure in the corresponding span cut.

In a path-restorable mesh network [21]-[22] demands affected by a span failure are restored simultaneously on an end-to-end basis for each O-D pair affected. This is done in a globally optimized manner that considers the specific failure and can exploit surviving stub capacity from failed working paths using stub release [22]. In a path-restorable network the total spare capacity is strictly sufficient only to support a multi-commodity maximum-flow (MCMF) type of simultaneous re-routing of all affected O-D pairs [32]. In its most capacity-efficient form this involves stub release in which the surviving working capacity units of failed paths are considered available as spare capacity for the particular restoration event. The automatic propagation of an Alarm Indication Signal (AIS) in a digital wrapper is a simple and fast means to effect stub release. The main difference relative to SBPP is that there is no single predetermined restoration route for each working path. Rather a collectively optimized re-routing of all failed paths will occur end-to-end in the presence of the specific failure, the surviving spare capacity following that failure, and the environment of stub release capacity. The path restorable designs we consider are non-joint in the same sense as above in that demands are first routed via their shortest paths before spare capacity is optimized. Further elaboration on the concept of stub release in path restoration is available in [21]-[23]. It has also been found in [21]-[23] that joint optimization adds little further efficiency to a path-restorable design so we consider the simpler non-joint case for comparison to the performance of the present invention.

Conventional Design of Span-Restorable Mesh Networks

The design of span-restorable mesh networks is most often approached using an arc-path Integer Linear Programming (IP) formulation introduced for SCA [20]. As our benchmark here we will use an extension of the model in [20] to include joint optimization of the working path routing (i.e. JCA)[25]. We define JCA as follows:

| | |
|---|---|
| S | Set of spans in the network |
| $P_i$ | Set of eligible routes for restoration of span i |
| D | Set of O-D pairs with non-zero demand |
| $d^r$ | Number of demand units for O-D pair r |
| $Q^r$ | Set of eligible working routes available for demand pair r |
| $\zeta_j^{r,q}$ | 1 if $q^{th}$ eligible route for working demands between O-D pair r uses span j, zero otherwise |
| $\delta_{i,j}^p$ | 1 if $p^{th}$ eligible route for restoration of span i uses span j, zero otherwise |
| $C_{j/l}$ | Cost of a unit-distance of unit-capacity on span j |
| $L_j$ | Length of span j |
| $f_i^p$ | Restoration flow assigned to $p^{th}$ eligible restoration route for span i |
| $S_j$ | Number of spare capacity units placed on span j |
| $g^{r,q}$ | Working capacity assigned to the $q^{th}$ eligible working route for demand pair r |
| $W_j$ | Number of working capacity units on span j |

JCA:     $$\text{Minimize} \sum_{j \in S} C_{j/l} \cdot L_j \cdot (w_j + s_j) \quad (1)$$

Subject to:  $$\sum_{q \in Q^r} g^{r,q} = d^r \qquad \forall\, r \in D \quad (2)$$

$$\sum_{r \in D} \sum_{q \in Q^r} \zeta_j^{r,q} \cdot g^{r,q} = w_j \qquad \forall\, j \in S \quad (3)$$

$$\sum_{p \in P_i} f_i^p = w_1 \qquad \forall\, i \in S \quad (4)$$

$$s_j \geq \sum_{p \in P_i} \delta_{i,j}^p \cdot f_i^p \qquad \forall\, (i,j) \in S \times S: i \neq j \quad (5)$$

The objective function minimizes the total cost of capacity placed on all spans in the network. Constraints (2) ensure that all working demands are routed. Constraints (3) generate the required working capacity on each span j to satisfy the sum of all (pre-failure) working demands routed over it. Constraints (4) ensure that restoration for failure of span i meets the target level of 100%. Constraint set (5) forces sufficient spare capacity on each span j such that the sum of the restoration paths routed over that span is met for failure of any span i. The largest simultaneously imposed set of restoration paths effectively sets the $s_j$ value on each span in the solution. To implement this type of formulation, one needs a pre-processing step to enumerate the sets of eligible working and restoration routes.

SUMMARY OF THE INVENTION

Therefore, there is provided in accordance with the invention, a method of restoring a telecommunications method that uses meta-mesh principles. The method has applicability to networks that include plural nodes terminating plural spans, the plural nodes including nodes of degree two and nodes of at least degree three. For greatest advantage of the method, at least some degree three nodes are connected by chains of one or more two degree nodes.

For restoration according to an aspect of the invention, the method includes the steps of detecting a span failure between a first node of at least degree three and a second node of at least degree three, the first node and the second node being connected by a chain of at least a third node, looping back local flows from the third node to one of the first node and second node; and routing express flows flowing through the first node and second node onto spans with spare capacity without looping back all express flows through nodes in the chain of nodes.

According to a further aspect of the invention, there is provided a method of planning telecommunication network capacity to accommodate restoration of span failures, the method comprising the steps of calculating required spare capacity in the telecommunications network taking into account the restoration of express flows according to the meta-mesh method; and allocating spare capacity in the telecommunications network according to the calculation.

According to a further aspect of the invention, there is provided a method of distributing spare capacity in a telecommunications network having degree two and degree three nodes, the method comprising the steps of characterizing, in a computer, the telecommunications network as a network containing nodes of degree three or more; and assigning spare capacity in the telecommunications network to minimize total cost of the network capacity subject to the constraints that (1) all single span failures are restorable, (2) spare capacity exists to support all restoration flows, (3) all working demands are routed in the telecommunications network; and (4) the working capacity of the telecommunications network is adequate to route working flows.

Once planned, the resulting telecommunications network may be implemented, as for example by implementing a telecommunications network, comprising plural nodes of degree three interconnected by chains of nodes of degree two; the nodes of degree three incorporating cross-connected equipment; and the nodes of degree two incorporating add-drop multiplexing equipment. Once built, the same processes can be used for ongoing decisions about which equipment elements in the chain to route a new demand through and where in the network, spare capacity needs to be augmented to ensure restorability, if anywhere.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS OF THE INVENTION

In this patent document, the word "comprising" is used in its non-limiting sense to mean that items following the word in the sentence are included and that items not specifically mentioned are not excluded. The use of the indefinite article "a" in the claims before an element means that one of the elements is specified, but does not specifically exclude others of the elements being present, unless, unless the context clearly requires that there be one and only one of the elements.

By changing the way capacity allocation and restoration in chains is carried out, a reduction in total capacity may be obtained while providing for full restorability of the network.

How Chains are Capacitated in the Conventional Model

Figure 1:
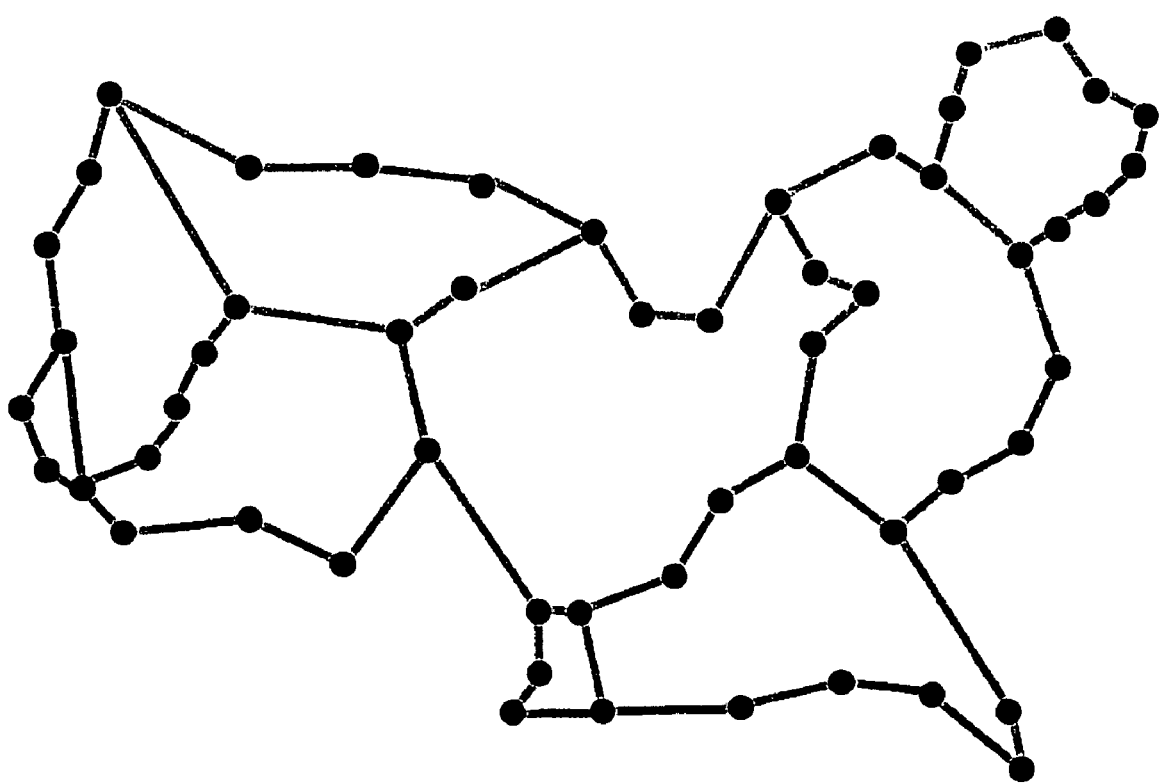
FIG. 1 is a graph showing a characteristic example of a sparse facility graph topology (55 nodes, 62 spans, $\bar{d}$=2.25, contains 14 chain sub-networks)
Figure 2:
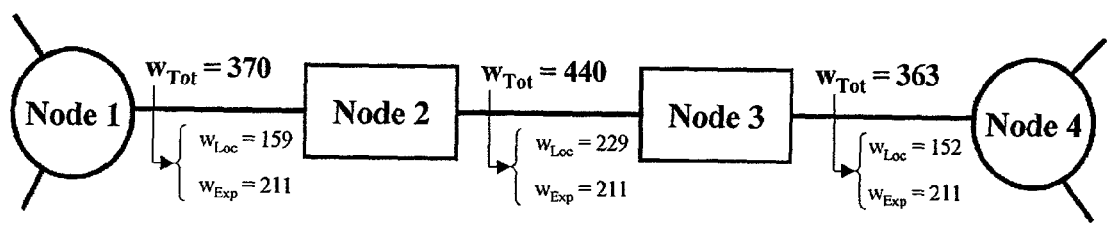
FIG. 2 is a schematic showing an example chain of degree-two nodes between two mesh anchor nodes.
Figure 3:
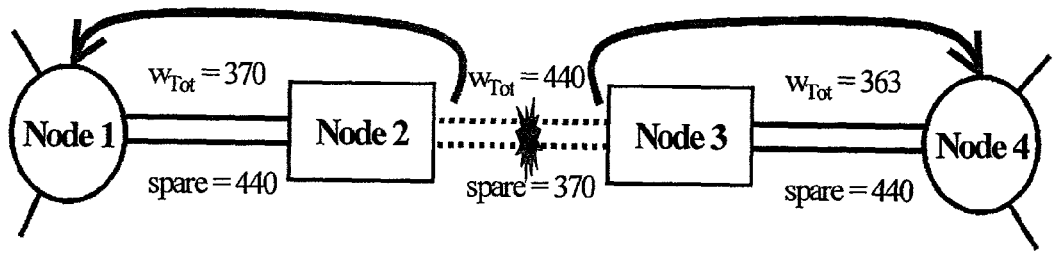
FIG. 3 is a schematic showing the amount of sparing on a chain is determined by the size of the largest working total.

The sparse network in FIG. 1 has 55 nodes and 62 spans for $\bar{d}$=2.25 and contains 14 chain sub-networks and seven direct spans. By definition, chains are bounded on each end by a node with $\bar{d} \geq 3$ which are the anchor nodes of the chain. The conventional mesh design model handles these chains in the following manner. FIG. 2 shows a chain of a three-span chain and a set of working capacity accumulations ($w_{Tot}$) resulting from the routing of demands in the network. The $w_{Tot}$ values may be either the resultant accumulation of demands crossing the span from shortest-path routing, or the corresponding totals from a joint capacity design which does not necessarily route demands on shortest paths. Under span restoration the entire chain must have spare capacity sufficient to support the loop-back re-routing of the span of the chain that has the largest working capacity cross-section. Strictly, one needs s_i=max (w_i), where w_i is not the maximum in the chain and s_i=second max(w_i) on the span i where w_i is the maximum in the chain. The conventional model will capacitate chains essentially as if they were sections of BLSR-type rings. Thus, in the example, the worst-case cut is of span 2-3 at 440 working units and so the spare capacity allocation within the chain would be as shown in FIG. 3.

Meta-Mesh View of an Aggregation of Chains

Figure 4:
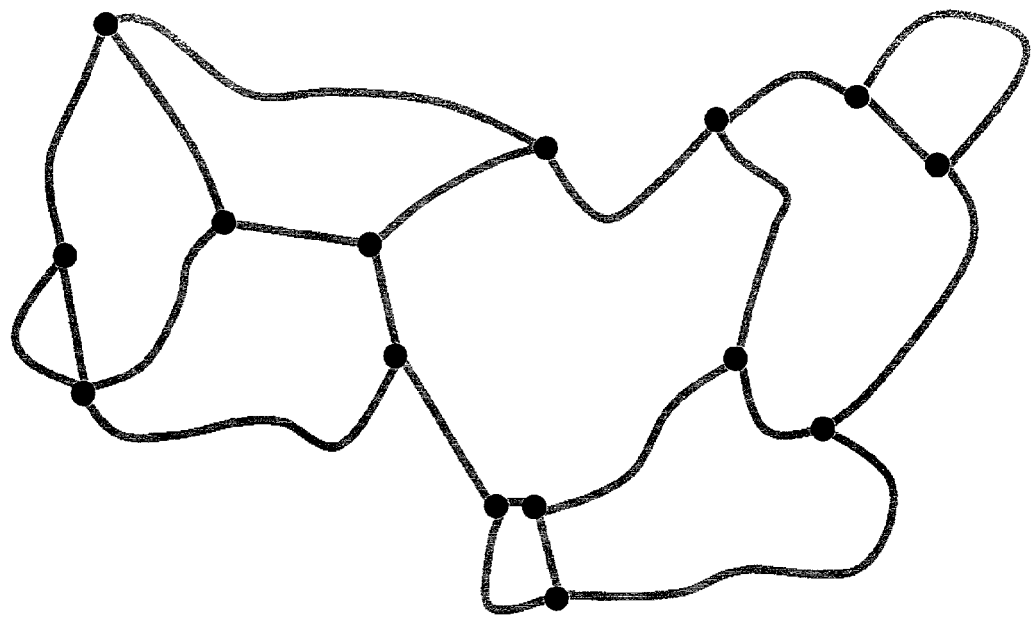
FIG. 4 is a schematic showing "meta-mesh" topology of the network in FIG. 1 (15 nodes, 23 spans, $\bar{d}$=3.07)

In the approach disclosed here, the chain is considered as a constituent part of a meta-mesh network. The meta-mesh is not a higher-layer network per-se, nor is it a sub-network. Rather it is the topology that arises when all direct spans and chain sub-networks are viewed equivalently as edges of another graph; the meta-mesh graph. Equivalently, the meta-mesh is the topology obtained when nodes of only degree 3 or higher are considered and no further distinction is made (for now) between direct spans and chain sub-networks. Both are just logical spans of the meta-mesh. In graph theoretic terms, the meta-mesh topology is a homeomorphism of the full graph. To illustrate, the meta-mesh graph for the network of FIG. 1 is as shown in FIG. 4.

The significance of the meta-mesh is that it is only at this level of abstraction that true mesh spare capacity sharing efficiencies can arise. While the complete network has 55 nodes, 62 spans and $\bar{d}$=2.25, the meta-mesh graph example has only 15 nodes and 23 spans with $\bar{d}$=3.07. By its nature, the meta-mesh graph is always of at least of degree 3. The potential difference in efficiency of a span-restorable mesh on the full network versus the meta-mesh can be seen by application of the 1/($\bar{d}$−1) lower bound on redundancy (see [18], [24], or [27]). The conventional JCA formulation, would thus be limited to a redundancy no lower than 1/(2.25−1)=80%. On the other hand, a span-restorable design on the meta-mesh graph could potentially be only 1/(3.07−1)=48% redundant. These are both lower bounds, not fully achievable in general, but it gives a demonstration of significant potential for efficiency increases from achieving restoration with the efficiency of the meta-mesh graph, not the full network graph.

Logical Chain-Bypass Spans

Referring to the $w_{Tot}$ values in FIG. 2, such accumulations of working flows will contain some demands originating or terminating within the chain, and others that pass completely through the chain, as shown for example in the bracketed $w_{Tot}$ values of FIG. 2. The $w_{Loc}$ values are intra-chain working capacity totals that arise only from demands that originate or terminate at one of the nodes of the chain. With the $w_{Loc}$ values given, the difference remaining must be express flow, denoted $w_{Exp}$. These are the accumulation of working demands that flowing entirely through the chain and arise either from demands for which nodes 1 or 4 are the origin or destination, or which flow entirely though this chain on general paths across the network as a whole.

If the breakdown of local and express flow through the chain is as shown in FIG. 2, then the conventional design is providing loop-back spare capacity for the entire cross-section of both local and express flows through the chain. In other words, the normal response to any span cut in the chain is to return both local and express flows via loop-back to the anchor nodes. From there, the restoration re-routing problem can be viewed as equivalent to span restoration of a single edge failure in the meta-mesh graph. Because the treatment of restoration flows is completely mesh-like once they reach the anchor nodes, the express flows are not required to be looped back to the anchor nodes. Rather, the express component of the working flow crossing the failure span may be returned to the anchor nodes simply by letting those demands fail all the way back to the anchor nodes. In other words, with respect to the express flows, the entire chain need only be viewed as one span of the meta-mesh graph over which these demands are travelling, and within which they can be restored. In this view, failure of any span of the chain is equivalent to failure of the corresponding logical span in the meta-mesh with respect to the express flows only. This is not the case for the intra-chain flows because the set of demands affected by each span cut of the physical chain differs depending on which chain span is cut. The local or intra-chain demands must therefore be explicitly looped back to the anchor nodes because their composition is altered by add-drop actions at nodes along the chain. The composition of the express flows is, however, unchanged depending on where the cut occurs in the chain, so they can be simply failed all the way back to the anchor nodes and do not need loop-back. The advantage in treating the express flows this way is that there will be no spare capacity required within the chain itself for restoration of any express flows, other than an allocation of spare that may be made to the chain from a globally efficient meta-mesh design standpoint.

How the Spare Capacity and the Real-Time Restoration Phase Change

Figure 5:
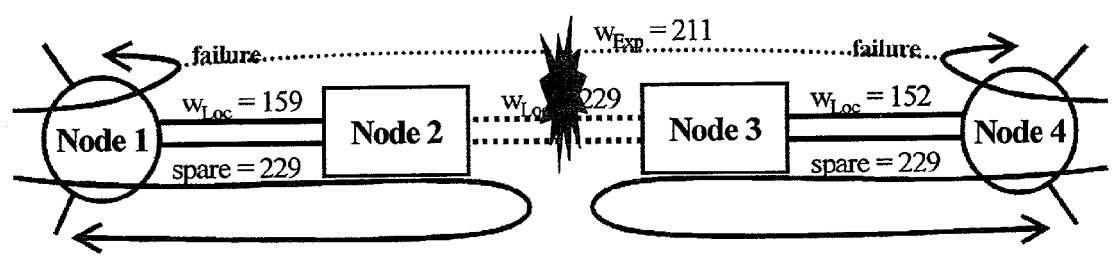
FIG. 5 is a schematic of showing spare capacity and restoration of a chain sub-network with express demand flow.

FIG. 5 shows the difference this restoration method makes in the example of FIGS. 2 and 3 in terms of both capacity and reconfiguration differences. Intra-chain working flows must still be matched by loop-back spare capacity so they can escape back to the anchor nodes with the demand composition they had at the particular location of the break. All express flow through the chain automatically fail back to the anchor nodes. By the nature of express flow, there is no change in demand composition for any physical span cut within the actual chain, express flows over chains are treated entirely with mesh-based restoration principles and never enter into the spare capacity sizing of a chain or ring. In the example of FIG. 3, the loop-back spare capacity requirement is therefore revised downwards as shown in FIG. 5, driven now by max$\{w_{Loc}\}$=229 as opposed to max$\{w_{Tot}\}$=440 previously. The express flows simply fail end-to-end within the chain and are detected as having failed by the OCX in the anchor nodes. The presence of active loop-back signals in the spare ports at the anchor nodes identifies these ports as the local targets for restoration path substations. Both types of failed working flow, once at the anchor nodes through failure or loop-back, are then logically unified as a single total amount of failed working capacity on the corresponding span of the meta-mesh. From that point on, nodes 1 and 4 of the example will co-operate as a conventional pair of Sender-Chooser nodes, within the meta-mesh of OXC nodes. When restoration paths are found through the meta-mesh of which this chain is a part, nodes 1 and 4 do the standard function in span restoration of making cross-connections that substitute the restoration paths between the corresponding failure/loop-back-appearance ports at their locations. Thus, one logical mesh-restoration event between nodes 1 and 4 in the meta-mesh transparently looks after simultaneous restoration of both the local and express chain flows.

Augmented Logical Topology

The implementation of the meta-mesh restoration approach requires modification of the conventional model of network restoration. First, the network topology file is augmented to include a logical bypass span in parallel with each chain sub-network. If a chain composition is (by nodes) A-B-C-D-E-F, with total mileage X, then the associated bypass span added to the topology is a new span with end-nodes A-F and mileage X. The idea of the logical bypass span is to represent the possibility of routing working flows over an express route through the chain. If a demand originates or terminates at a node within a chain, the solver will be forced to route it into the chain (implying its participation in the loop-back spare capacity of the chain). But when a demand is routed over the chain but is not terminating in the chain, the logical bypass represents an equidistant routing option that does not have the side effect of contributing to the loop-back spare capacity. The revised formulation will not explicitly require the solver to use the bypass spans. Rather, under global minimization of total capacity, the solver will be further enabled to reduce total cost by the option to treat express flows in this separate way. In such a case the express flow will follow the physical route of the chain using the same fibers, cables, etc. but will not be implicitly handled by each OADM site en-route of the chain. Rather, express flows may go through splices or optical amplification, but are accessed only by the OCXs at the anchor nodes.

A side effect of routing express flows on the bypass spans is an implicit grooming benefit. Grooming is the long established technique of selecting and grouping demands that share a common destination (or next-hub en-route) onto the same carriers to reduce the nodal equipment needed en-route. Like grooming in WDM networks [28], the action of the solver in the presence of bypass spans results in a solution that reduces equipment counts. The proposed design model forces the desirable grooming effect. Here, the nodal equipment reductions arise because express demands do not consume interfaces or core bandwidth in the OADMs en-route of the chain. The grooming effect is separate from the benefit of spare capacity reduction through the loop-back arguments but is automatically captured by the aspect of jointness in the formulation.

Chain-Wise Dual-Failure Scenarios

Secondly, the JCA model is extended to convert single physical cuts on spans of each chain into the corresponding logical dual-failure scenarios of failure of a physical chain span between its immediate end-nodes and simultaneous failure of the associated logical bypass span between the anchor nodes of the corresponding chain To represent these simultaneous logical span failure scenarios the set of spans, previously just S is now viewed as:

| | |
|---|---|
| $S_d$ | Set of direct spans in the network |
| $S_b$ | Set of logical bypass spans in the network |
| $S_c$ | Set of chain spans = S diff ($S_d$ union $S_b$) |

Constraint sets (2), (3), and (4) from the JCA formulation (which perform working routing, working capacity placement, and restoration routing, respectively) remain unchanged in form in the meta-mesh model. However, the prior sets of eligible working routes $Q^r$ and restoration routes $P_i$ are regenerated within the augmented logical topology with the added structuring to $P_i$ to recognize the logical dual-failure combinations that now arise. The new $Q^r$ includes the additional routes utilizing bypass spans. The $P_i$ for all direct spans remain unchanged from JCA but the route-sets $P_i$ for chain or bypass span restoration are restricted so that no chain span can be allowed to presume restoration over its associated (but co-failed) bypass span. The eligible routes for restoration of all physical (direct and chain) spans from the JCA formulation inherently already have the property of not using any bypass spans (because the latter were not present in the JCA problem) and so can be used directly from the JCA problem if available. In addition, new sets of eligible routes for restoration of each logical bypass span are generated within the augmented logical topology with a prohibition against routes using the associated physical chain spans.

Constraint set (5) from the JCA formulation is also modified to capture the dual-failure scenarios when a chain span is cut causing its bypass span to simultaneously fail:

$$s_j \geq \sum_{p \in P_i} \delta_{i,j}^p \cdot f_i^p \qquad \forall\, (i,j) \in S_d \times S: i \neq j \qquad (5a)$$

$$s_j \geq \sum_{p \in P_i} \delta_{i,j}^p \cdot f_i^p + \sum_{p \in P_k} \delta_{k,j}^p \cdot f_k^p \qquad \forall\, (i,j) \in S_c \times S: i \neq j, k = k(i) \qquad (5b)$$

Constraint (5a) ensures there is sufficient spare capacity on any span j to accommodate all restoration flow routed over it for failure of any direct span i. Constraint (5b) places enough spare capacity on span j to carry all restoration flows simultaneously routed over it for simultaneous failure of any chain span i and its associated bypass span k. k(i) is the many-to-one mapping between individual spans of the full network and an associated logical bypass k. For instance, if spans 7 8 9 11 12 comprise chain 6, then k(7)=k(8)=(etc.)=6.

Models Used to Obtain Test Results

Three groups of networks were tested. The first is a set of nine independent random network instances with differing network degrees. They ranged from 30 nodes and 37 spans to 44 nodes and 52 spans. For these random graphs (and subsequent networks) the length of each span is the Euclidean distance on the plane between the end nodes the span connects. Each of the Group 1 test cases was supplied with a gravity-type demand pattern, discussed below. The idea with these random networks was that they would produce a scatter-plot in the space of capacity versus nodal degree to obtain an initial indication of potential for the meta-mesh idea.

Figure 6:
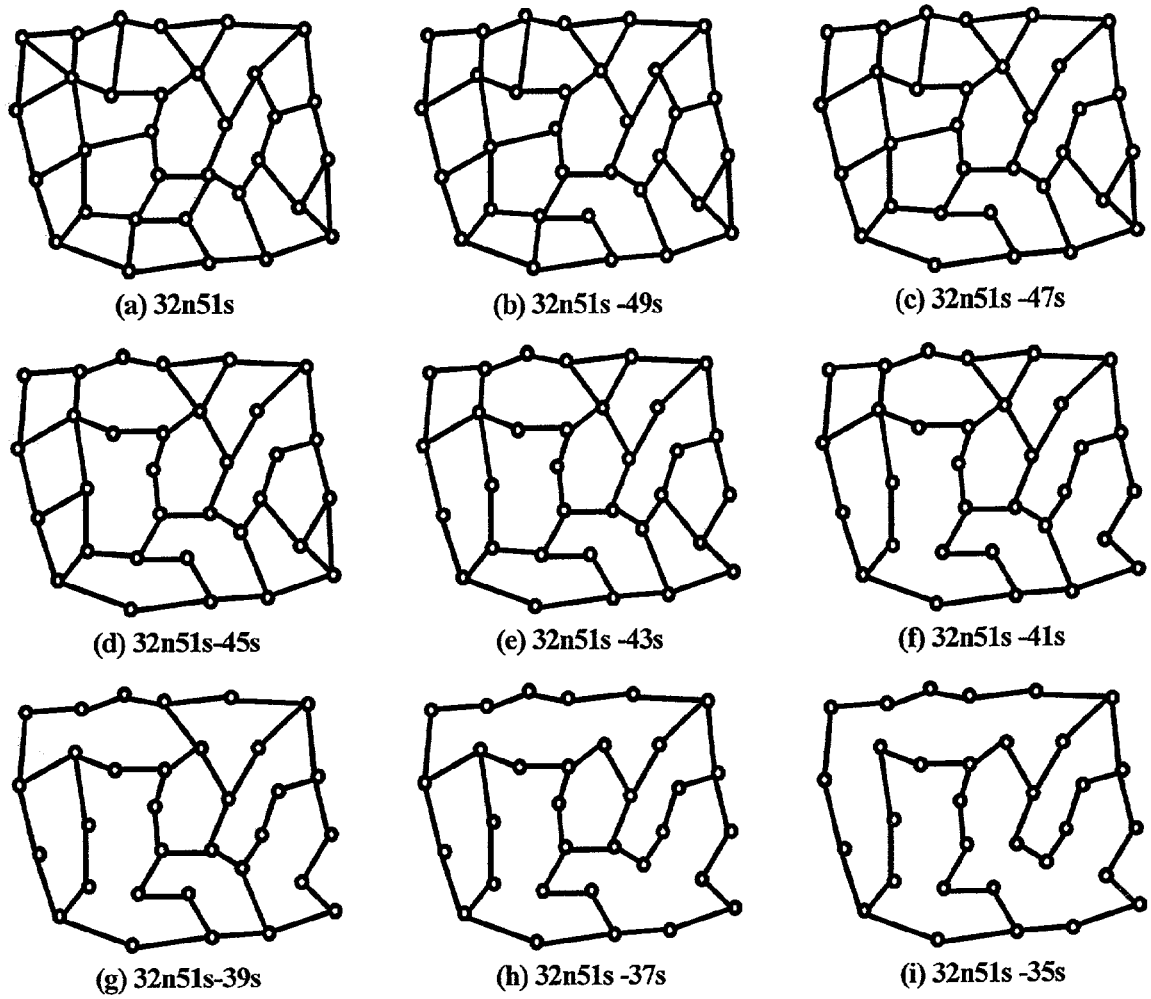
FIG. 6a-6l are schematics showing a sampling of the Group 2 family of successively sparser test cases.

Following initial trials with the random networks, two further groups of test networks were produced having a systematic progression from high to low nodal degree to better facilitate inspection and understanding of the meta-mesh designs as nodal degree varies. The latter networks were obtained by applying a succession of individual span removals to an initially high-degree master network while keeping all nodal positions and the end-to-end demand patterns fixed. The master network for the Group 2 family of networks, denoted 32n51s, is shown in FIG. 6(a). It has 32 nodes and 51 spans and no degree-2 nodes. Seventeen progressively sparser test networks were derived from this master by random removal of one span at a time, subject to rejecting a removal if it would violate bi-connectivity. The number and size of resultant chain sub-networks were allowed to arise spontaneously as the average nodal degree is lowered through these span removals. FIG. 6 illustrates a sampling of the successively lower degree networks in Group 2. A set of 39 Group 3 network graphs was produced by the same method to provide a further corroboration of the basic results. The Group 3 test networks, which are not illustrated for brevity, were similarly derived from a 40 node, 80 span master network (40n80sl), yielding 39 sub-networks with $\bar{d}$ varying from 4 down to 2.1. The Group 2 networks were tested under all four of the demand patterns, which follow, while Group 3 networks were tested under uniform random demand only.

Demand Patterns

The treatment of express flows versus local flows in chains is at the heart of the new method. A variety of demand patterns were used to identify any strong dependency that might arise. For instance, the propensity to have express flows over chains may be lower if demands tend to be very localized than if demands are as likely to cross the continent as go to an adjacent node. We therefore defined and used the following demand models following fairly common practice for generating instances of demand patterns for use in research studies [33] [34] [35]. Summary properties of the four demand data sets, as used here, are given in Table 1.

Type 1: Inverse-distance "Gravity"-Demand Model: In this model, demands are generated from a mutual attraction effect proportional to node importance, but with an inverse distance dependency:

$$\text{demand}(a, b) = int\left[\frac{\text{nodal degree}_a \times \text{nodal degree}_b}{\text{distance}} \times \text{constant}\right] \qquad (6)$$

In real networks, the population of a city or other regional measure of importance can be the basis of a node importance factor. Here, as a surrogate to create a measure such as population size or node importance, we used the degree of the node in each network (or in the master network). In the results that follow, the constant was set to 50 while the average length of spans was approximately 114 km, implying that there was about a halving of the expected demand at one average span length. This can be interpreted as a strongly localizing model of demand that may not be representative of some virtually distance-independent demands such as one might expect in a NY-LA relation.

Type 2: Non-distance-weighted attraction model: This is the same mutual-attraction model but with no inverse-distance effect ("distance" in the Type 1 model is set to 1.0). This allows generation of strong distance-independent demands such the notional LA- NY example. It may also be more characteristic of a metropolitan-scale network where there is virtually no distance-based attenuation of demand and of Internet-driven demand patterns where any given session or transaction is as likely to half-way around the world as it is to be in the same city. The constant used here was~0.6, found through adjustment so that the mean and total demand of the test cases would be quite close to that of the Type 1 demand patterns.

Type 3: Uniform Random Model: In this model every O-D pair is assigned a demand intensity from a discrete uniform random distribution in {1 ... 10}. This model was included to avoid any possible coupling between the tendency for high degree nodes (which get large demands under the attraction models) to also be anchor nodes of chains. The uniform random model has no bias to this effect and is as likely to generate a large demand to/from a degree-2 chain node as an anchor node.

Type 3: Bi-modal Uniform Random Model: This demand pattern was intended to check for possible dependence on the variance of the uniform demand distribution. The notion is that for the same uniform mean demand level, the opportunities for express flow optimizations may be relatively greater with high variance. This demand pattern was generated so that demand values wound up being bi-modal uniform random on the gapped range: ({1 ... 3} {8 ... 10}), with roughly the same mean as the uniform random model.

Mesh Network Design and Solution Methods

The meta-mesh designs and five other types of design against which it is compared (1+1 APS, SCA, JCA, SBPP, and path restoration) were implemented in AMPL Mathematical Programming Language and solved with the Parallel CPLEX 7.1 MIP Solver on a 4-processor Ultrasparc Sun Server at 850 MHz running the Sun Solaris Operating System 2.6 with 4 GB of RAM. None of the meta-mesh designs took more than two minutes to solve, although the SBPP problems sometimes took one hour to solve. Most details of the other design formulations are available in published sources and so are only referenced here. The SCA design uses the formulation and solution method detailed in [25] except that for this study the modularity was one capacity unit, while JCA is given above. The path-restorable designs were based on the non-modular path restoration model with stub release but without joint optimization of working path routes in [22]. The meta-mesh design method was also detailed above. The 1+1 APS dedicated path protection designs do not strictly require an optimization model. They can be generated by first finding the shortest route and then the next shortest disjoint route by temporary removal of all spans on the first route from the graph. For SBPP we are not yet aware of other published sources for the SBPP model, so the formulation we used for SBPP is given here:

$$SBPP: \quad \text{Minimize} \sum_{j \in S} s_j \cdot C_{jil} \cdot L_j \quad (7)$$

$$\text{Subject to:} \quad \sum_{b \in R_r} x_r^b = 1 \quad \forall r \in D \quad (8)$$

-continued $$\sum_{r \in D_i} \sum_{b \in R_r^j} x_r^b \cdot d^r \le s_j \quad \forall (i, j) \in S \times S: i \ne j \quad (9)$$

The objective function (7) minimizes the total cost of spare capacity for backup paths. $D_i$ is the set of O-D demand pairs affected by failure of span i. $R_r$ is the set of eligible disjoint backup routes for demand pair r, and $R_r^j$ is the set of backup routes for demand pair r which cross span j. Other parameters and variables are as given above. Constraints (8) assert only one backup route b per demand pair r. $x_r^b$ is a 1/0 decision variable taking the value of 1 if backup route b for demand pair r is used, and zero otherwise. Constraints (9) assign sufficient spare capacity on each span to accommodate all backup paths simultaneously crossing the span for failure of any other span.

Computational Aspects

A number of other aspects were common to all design types and their solutions. All working and spare capacity allocations were integer, corresponding to capacity design and restoration mechanisms at the wavelength level. For comparative studies we avoid any specific modularity assumptions which could obscure the general underlying comparison of methods that is intended. However, any of the models can be converted to a modular formulation as shown in [25]. Results are based on a full CPLEX termination or a MIPGAP under $10^{-4}$ (i.e. within 0.01% of optimal) with the exception of the Group 2 path restorable designs (within 0.1% of optimal), Group 2 SBPP designs (strictly 5%, nearly all within 2%), and Group 3 SBPP designs (within 1% or better). All designs were also based on an arc-path approach. This requires pre-processing steps to enumerate sets of eligible routes for restoration and, in the joint formulations, eligible routes for working flow assignment as well. Eligible routes are defined as in Herzberg [20], in which the basic spare capacity design problem is cast as an assignment of restoration flows to eligible distinct routes over the network graph. In practice this approach is desirable so that restoration route properties can be under engineering control for length, loss, or any other eligibility criteria.

For span-restorable designs in general, the ideal is to represent all distinct routes between the end nodes of each span failure, excluding the failed span, up to the threshold hop limit, H*. A practical problem comes when the network contains long chains because a high hop limit is required to represent the restoration re-routings that will be required. Say a chain of 8 hops exists in a network whose meta-mesh topology itself has H*=5. Restoration may require an overall hop limit of 12 or more, implying a huge set of eligible routes if H≧12 were to be attempted in representing eligible routes for all failure scenarios. The number of distinct eligible routes will quickly be above memory limits. We therefore use the following strategy, which is both effective and practical for representing and solving the required design models, and also greatly improves the scalability of this form of design solution method. The idea is not to presume a specific hop limit and attempt to generate all distinct routes up to the limit. Rather, we use a procedure that results in a specified number of the shortest distinct eligible routes at whatever hop limit is required to realize the required number for each failure scenario independently of one another. All the results here are based on this procedure to represent at least 20 distinct routes for every span restoration scenario and at least 10 distinct eligible route choices for the routing of every working demand in the "joint" design cases, which includes meta-mesh. Essentially similar route-enumeration methods were used to populate the SBPP and path-restoration design models for comparison, except that the restoration route options are end-to-end on each O-D pair. Prior tests with this approach suggest that any remaining gap to absolute optimality due to limitation of the route-sets is ~1% or less. Certainly the comparative conclusions of the study are not affected by any remaining gap against absolute optimality.

Results Comparing Meta-Mesh Designs to Joint Span-Restorable Designs

Figure 7:
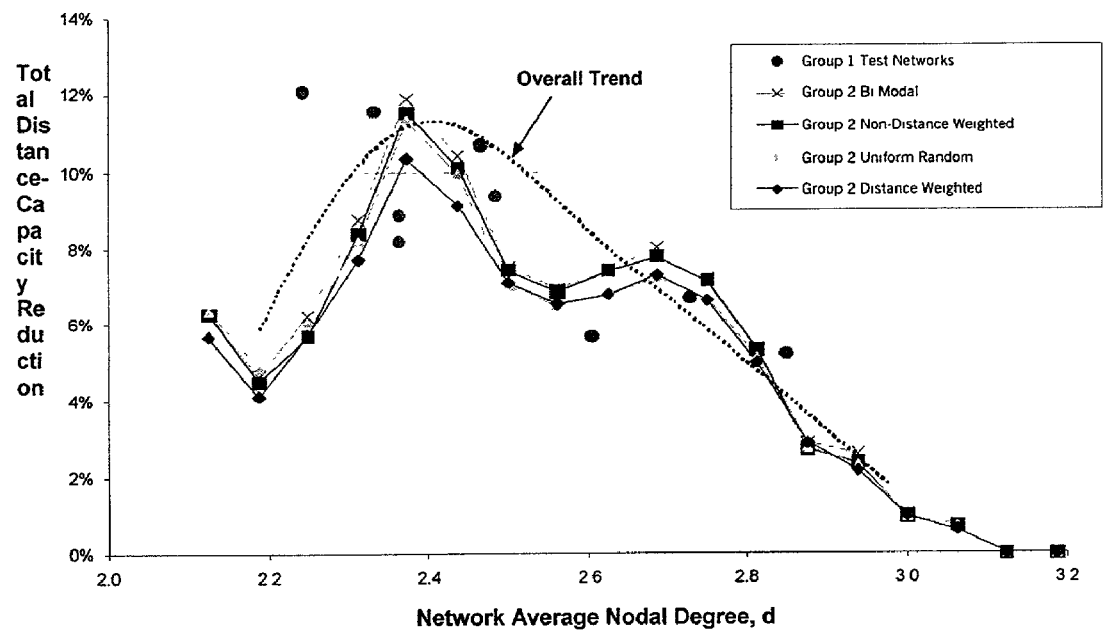
FIG. 7 is a graph showing total distance-capacity savings relative to JCA versus average nodal degree (Groups 1 and 2 networks)

FIG. 7 is a summary plot of all the Group 1 and 2 results in terms of the reduction in total network design capacity of meta-mesh relative to JCA versus $\bar{d}$ in each test case. The plot portrays both the scatter of the nine Group 1 test cases and the family of 18 Group 2 networks. Capacity is the distance-weighted total transmission capacity. The meta-mesh designs improved upon the JCA by a 5.2% to 12.1% reduction in total network capacity cost in the Group 1 trials. Group 2 trials showed essentially no improvement in the initially high degree networks, rising to a peak of nearly 12% in the vicinity of $\bar{d}=2.35$ before falling again. Comparing across all four demand models in FIG. 7 we see that aside from the strongly localizing Type 1 (inverse-distance) test cases, there is hardly any other noticeable differences between demand models. And even under the strongly localizing Type 1 gravity model there is only about 1.6% less capacity savings at its greatest. This is a fairly small effect, but one, which was predicted, and serves to validate our understanding of how and when this design strategy works.

Figure 8:
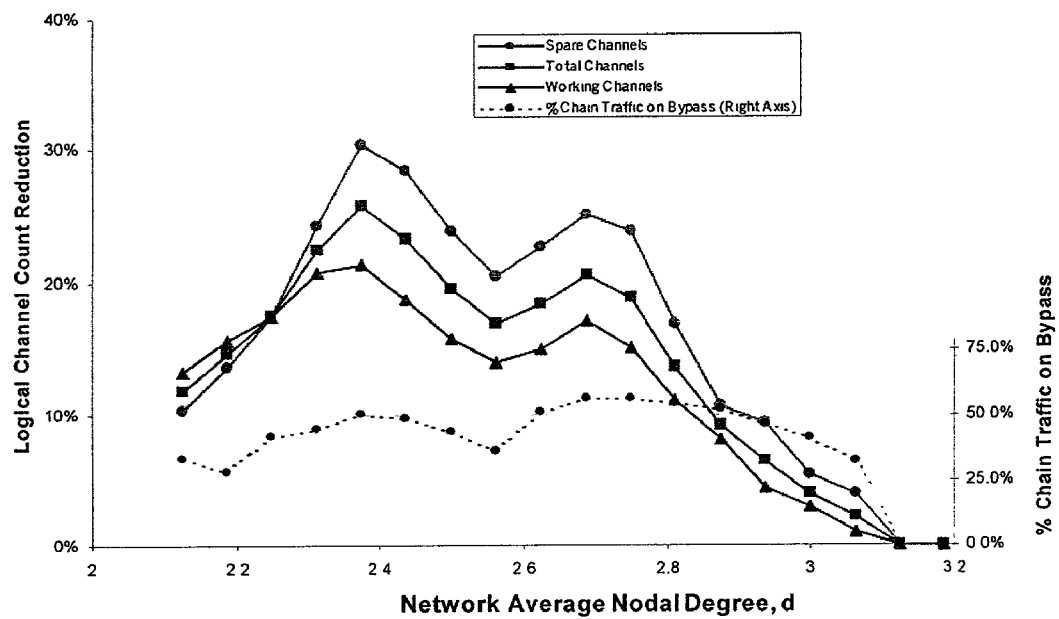
FIG. 8 is a graph showing the breakdown of logical channel reductions relative to JCA for working, spare, and total capacity (Group 2 networks)

FIG. 8 gives a corresponding breakdown of the Group 2 designs under the Type 2 demand pattern in terms of the constituent savings in working, spare, and total logical channel counts respectively. While costs for ducts, fibers, amplifiers, regenerators, etc., scale with total distance-capacity, certain nodal termination costs on OXC and OADM scale with logical channel counts (each logical channel is terminated on each end, regardless of distance, by either an OXC or OADM). In the vicinity of the peak in FIG. 8 there is up to 30% reduction in spare channel counts and 21% in working channel counts. Overlaid on FIG. 8 is a corresponding analysis of the average fraction of working flow through chains that is express flow in the meta-mesh designs. This diagnostic partly confirms the understanding that the meta-mesh benefit scales in proportion to the relative amount of express demands crossing chains.

FIGS. 7 and 8 both show an interesting overall trend where savings (relative to JCA) first increase as $\bar{d}$ is lowered but then drop off again towards the most sparse cases. The behavior is not an exact parallel of the "% express on chains" data, however. An overall explanation seems possible, however, by linking the latter data to considerations of how the number and length of chains also varies with $\bar{d}$. varies. The meta-mesh design produces its benefit where there are significant express flows through chains. The benefit against JCA should therefore be greatest when there are long chains traversed by significant express flows. In FIGS. 7 and 8, these effects evidently reach a joint maximum at $\bar{d} \approx 2.4$. Although the "% chain express" curve is relatively flat it is the average length of chains that peaks around $\bar{d} \approx 2.4$. However, as $\bar{d}$ goes even farther towards the limit of $\bar{d}=2$, more nodes that were previously sources or sinks for express demands over chains are now also part of a chain, converting their demands into intra-chain demands. Thus, the continued reduction of $\bar{d}$ reduces the number of express-flow relationships, which are the opportunities for chain optimization. Indeed, in the logical limit of a Hamiltonian cycle, all demands are "intra-chain" and there can be no express-flow related spare capacity savings in the sense pursued here. The relative benefit is also zero at the high $\bar{d}$ range because those networks contain few, if any, chains and the meta-mesh and conventional designs are then identical.

Figure 9:
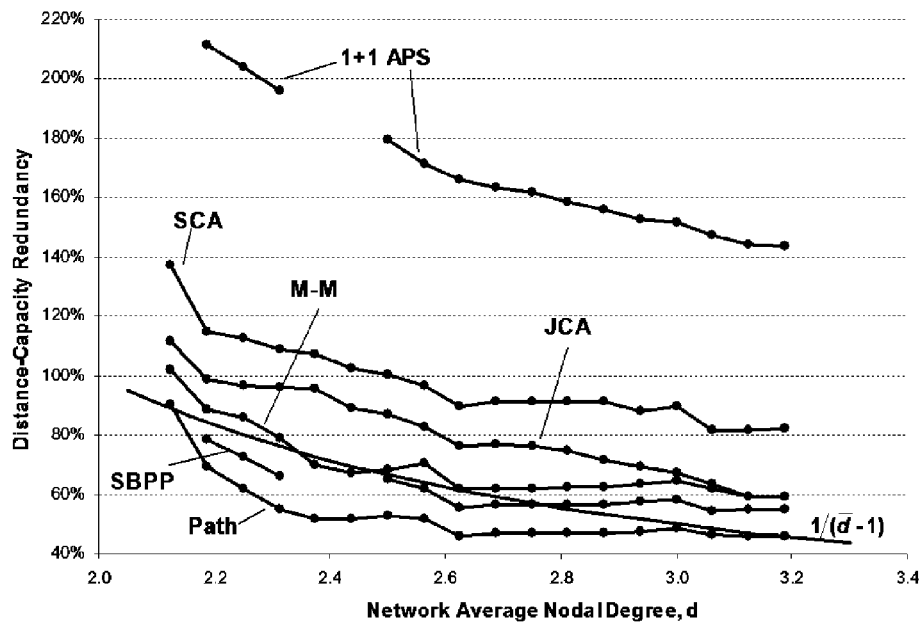
FIG. 9 is a graph showing the redundancy of various mesh protection and restoration schemes versus network average nodal degree (Group 2 networks)
Figure 10:
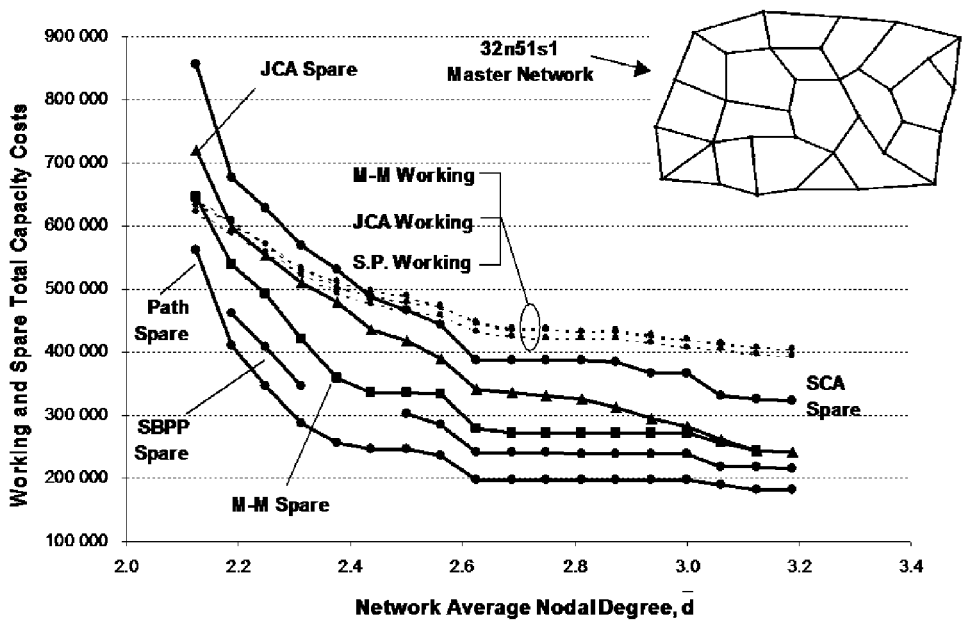
FIG. 10 is a graph showing breakdown of working and spare capacity versus network average nodal degree on Group 2 test networks.
Figure 11:
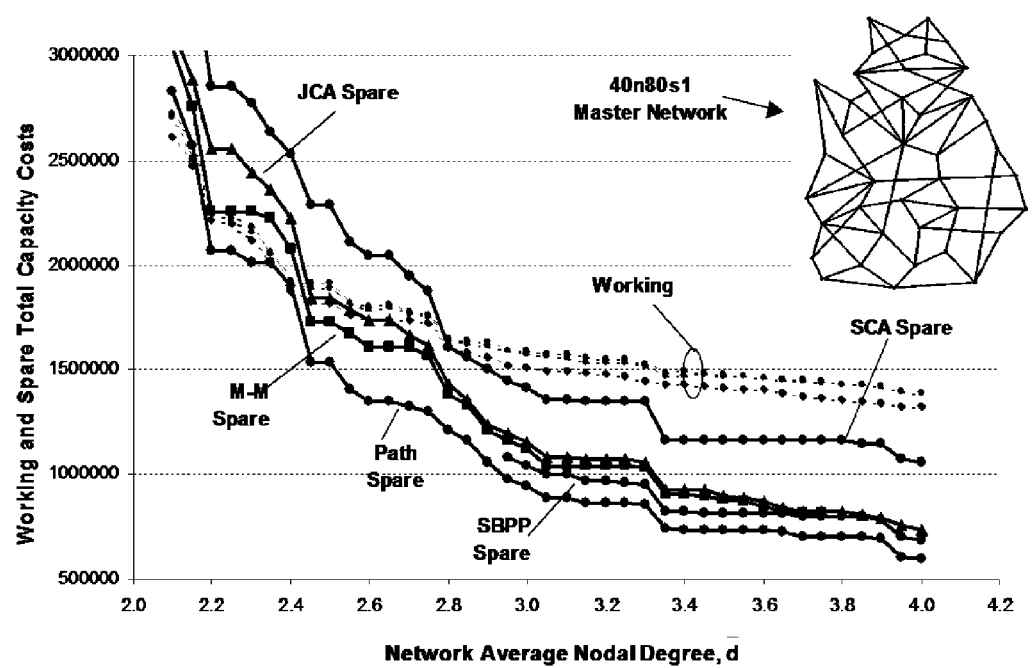
FIG. 11 is a graph showing breakdown of working and spare capacity versus network average nodal degree on Group 3 test networks.

Comparison of Meta-Mesh Designs Against Other Mesh Protection and Restoration Schemes The meta-mesh approach was then compared with path-oriented schemes. To address this question in available space we restrict ourselves to the Group 2 and 3 network families each under a different demand model. FIG. 9 presents results for the Group 2 networks under Type 2 demands in terms of total network redundancy. This framework allows us to include the well known $1/(\bar{d}-1)$ bound on redundancy [18], [24], [27] for span-restorable networks as a further basis for comparison. FIG. 10 then presents the absolute working and spare capacity requirements of each design in FIG. 9 and FIG. 11 shows the same form of representation for the Group 3 family of test networks under Type 3 demand. In all three figures, redundancy and capacity are distance-weighted measures.

A striking effect in FIG. 9 is that 1+1 APS is never less than 140% redundant and surpasses 200% on the sparser graphs. This is consistent with the fact that 1+1 APS is really a form of ring-based protection. The gap in the 1+1 APS curve (and SBPP curves) is due to routing infeasibilities discussed below. We will give no further attention to the 1+1 APS scheme. In FIGS. 9, 10, 11, the observed ranking of SCA, JCA, and path restoration is consistent with expectations from theory and with results for prior single-network solutions to these problems. JCA improves considerably over SCA by finding slight changes to the routing of working paths that have the effect of a relative leveling out of nodal working capacity quantities, improving the overall capacity efficiency. Also notable in FIG. 9 is how well SCA and JCA parallel the $1/(\bar{d}-1)$ lower bound curve. The bound is obviously lower on the scale but the similarity in shape suggests that the arguments underlying the bound are accurate for span-restorable networks. By comparison the path-restoration curve is not only lower than the $1/(\bar{d}-1)$ bound for span restoration but it also drops at a steeper rate initially as connectivity increases and is then almost flat as the network becomes more richly connected. Note the actual redundancy levels of the path restoration designs. Anywhere above $\bar{d}=2.6$ or so, they are in the 45% to 50% range. This is three to four times more efficient than 1+1 APS and almost twice as efficient as SCA. This also substantiates the widespread general appreciation that path-restoration with stub release is the most efficient scheme known.

The remaining curves in FIGS. 9-11 are SBPP and meta-mesh. The SBPP curve is punctuated by cases where the SBPP (and 1+1 APS) problems had one or more routing infeasibilities on the given graph. The general issue arises from the process of taking the shortest route first for the working path. It can then be impossible to find a disjoint second route. This is covered further in [27]. The problem can be overcome by instead finding the shortest cycle containing the two O-D nodes or to iteratively alter the first route choice upon discovery of the infeasibility until a disjoint route exists. In the present work, however, we modeled the simpler provisioning model as it appears to be considered that SBPP would work this way in current standards deliberations. We would, however, point out the issue of such routing infeasibilities and note that they can be particularly frequent in sparse graphs. Setting aside the missing data points from infeasibilities, SBPP is generally intermediate in efficiency between the meta-mesh designs and path restoration with stub release. In practice, overcoming the provisioning infeasibility problem will add slightly to the capacity requirements of the SBPP curve. Within this backdrop, the meta-mesh designs provide an intermediate set of characteristics, especially around $2.4 < \bar{d} < 2.8$. In this region of FIGS. 9-11, the meta-mesh designs are essentially as efficient as SBPP and are even below the $1/(\bar{d}-1)$ bound although operating with only a span restoration mechanism.

The slightly rising slope on segments of the redundancy curves in FIG. 9 is only a reflection of the fact that working capacity keeps decreasing slowly as $\bar{d}$ rises. The result is that the ratio of spare to working increases slightly. The total capacity cost is nonetheless dropping.

FIGS. 10 and 11 show the absolute totals of working and spare capacity in the mesh designs. The plots show fairly clearly that amongst competing mesh-restorable design types, the significant differences are essentially all in the spare capacity. All schemes use virtually the same amount of working capacity which is very close to that required for simple shortest path routing. Even where JCA and meta-mesh employ joint optimization, the working paths still deviate only very slightly from shortest paths. A related interpretation is that in considering evolution from rings to mesh, the benefit in working path routing is essentially all obtained by going to any kind of mesh scheme. The exact type of mesh scheme essentially matters only to the further savings obtainable through spare capacity efficiency.

We have disclosed a refinement to the mesh network architecture which targets chains in a low-degree span-restorable network and increases the capacity efficiency of the overall design and reduces the amount of nodal equipment required in chains. The method works by treating chain sub-networks in a manner that refers the greatest amount of working flow immediately to the meta-mesh graph for efficient mesh restoration and minimizes the amount of loop-back spare capacity needed in chains. The changes to the restoration mechanism are minor. If a span cut occurs within a chain, the adjacent OADMs perform their loop-back function as before, but only for local flows transmitting them. Express flows are not logically routed through the OADMs (although they may physically pass through waveband passthrough filters at the OADMs). Upon failure in the chain, the express working wavelengths are allowed simply to propagate their failure condition from the failure span out to both anchor nodes. Either Loss of Signal or Alarm Inhibit Signal can alert the anchor nodes of the failure. Once at the anchor nodes, failed-back express wavelengths and looped-back local channel wavelengths are unified from a restoration requirement viewpoint as a single logical span failure of combined capacity requirement for restoration by the meta-mesh OXC nodes.

Test results showed up to 30% reduction in spare channel counts and up to 12% savings in total distance-weighted capacity depending on $\bar{d}$. More important in general is the understanding now validated that the actual benefit in any given case depends on the volume of the express demand flows through the dominant chains of the networks. The method would be especially advantageous where large cities exchange considerable demand flows over a chain of smaller centers between them.

We see the application specifically to DWDM networks as follows: First, only the meta-mesh nodes require full optical-cross-connect functionality. These are the only nodes with degree of 3 and above and the only ones that need to function as mesh-restoration-capable nodes. Chain node sites can use simpler OADM equipment, which is topologically matched to the degree-2 sites and only required to support a BLSR-like loop-back reaction upon failure. The logical bypass flows on chains are also an ideal application for a waveband pass-through feature on the OADMs. If the express flows are conveyed through chains via OADMs with passive waveband pass-through filters, chain span failures will propagate a loss of signal alarm to the optical cross-connects in the anchor nodes. This triggers an otherwise normal mesh restoration reaction that proceeds, for both express and looped-back working capacity within the meta-mesh graph.

Express flows are identifiable or known at the time they are provisioned in the network, based on the origin and destination nodes. If the route of the demand or service path traverses the chain but does not have any node of the chain as its origin or destination, then it is an express flow. This property is easily detected when new service paths are established in an existing network or when the demand is routed in the stages of designing a network. If a particular demand flow is identified as express flow it is given a different treatment in terms of the hardware elements along the chain that handle it. While the non-express flows must pass through each ADM en-route of the chain, the express flow can physically pass through on a separate fiber or wavelength of a fiber designated to be spliced right through, or passed right through by a wavelength selective filter in the latter case. Other variations may be that instead of passively passing through over a simple fiber glass splice or through a passive filter, the express flow signals may undergo simple regeneration or optical amplification as is required by their transmission constraints. Treatment of express flows in this manner is different from being passed through the more expensive and capacity-limited ADM nodes en-route.

In implementation of the restoration of a span failure, the two degree nodes in a chain of nodes affected by a span failure need not deal with the express flows, and need not identify express flows. All local flows are looped-back in accordance with conventional loop-back procedures. Failure of the span may be identified in any of several ways, including arrival of the loop-back signal at the end of a chain of nodes, loss of express flow at a degree three node, loss of a test pattern or a flag on traffic indicating the failure of the span. The degree three node at which the failure is detected then may act in a conventional sender-chooser configuration to find spare capacity for routing both the express and local flows. The spans in the network may be any of various conventional telecommunication spans including wire and optical.

On average, the meta-mesh designs took twice as long to solve as the corresponding JCA designs with the present methods. Although architectural concepts, not run-times, were the primary point of this work, it is practical to consider how this approach scales for larger networks with many more chains. In this regard it is important that the meta-mesh scheme remains essentially a special form of span restoration, not path restoration. The point is that in both real-time for restoration and compute-time in design, the span-restorable approach is not as sensitive to the complete network size because every failure and restoration response is treated relatively locally. In contrast the real-time speed and design-time requirements in path-oriented schemes both respond directly to total network size. Interestingly, the longest-running formulations here (by far) were those for SBPP, apparently due to its large number of pure 1/0-decision variables. A further point on scalability is that the technique of defining and budgeting eligible routes in the arc-path type of design formulations is useful in comparative planning studies because it allows a trade-off between design solution time and solution quality. For quick comparative studies, fewer eligible routes may be appropriate. Longer runs for final designs can use more eligible routes. Ultimately, however, if run-times on the largest networks become intolerable, there is a large body of Operations Research (OR) expertise that can be drawn upon to attack the computational problem (with column generation or lower bounding techniques, for example). Further effort on speeding the related computational problem is only warranted once the magnitude of the achievable benefits are appraised, as they now have been.

In FIG. 9 the overall redundancy of the chain optimized designs can actually be better than the $1/(\bar{d}-1)$ bound for a span-restorable mesh network. And in FIGS. 10-11 the spare (and total) capacity of the meta-mesh designs is approaches that of spared-backup path protection. The chain-optimized designs represent a specific kind of step towards path restoration, one that happens to be especially effective for sparse graphs. Express flows are restored between the anchor nodes, which serve as a kind of pseudo-origin-destination node pair, while local flows are treated in a span restoration like manner. But for local flows within a chain, there is no difference between path and span restoration within the chain itself. Moreover, it can be reasoned through that for express flows between the anchor nodes themselves, and for all local flows between an anchor node and a respective chain node, the resultant meta-mesh restoration is identical to path restoration for the stipulated demands. Therefore, to the extent that chains are a significant consideration in sparse networks, the meta-mesh method effectively moves the network design towards the efficiency of a path-restorable design on the same topology, even though it continues to use or require only a span restoration mechanism. Thus, it is believed that span restoration on the meta-mesh abstraction of a sparse graph can approximate path restoration on the full graph.

TABLE 1

|  | Distance-Weighted | Non-Distance-Weighted | Uniform Random | Bi-Modal Random |
|---|---|---|---|---|
| min | 2 | 5 | 1 | 1 |
| max | 33 | 12 | 10 | 10 |
| mean | 5.9 | 5.8 | 5.8 | 5.7 |
| $\sum_i d_i/S$ | 74.5 | 73.2 | 73.6 | 72.0 |
| stdev | 3.9 | 1.3 | 2.5 | 3.6 |
| variance | 15.2 | 1.8 | 6.5 | 13.3 |

REFERENCES

[1] B. Mukherjee, "WDM Optical Communication Networks: Progress and Challenges," *IEEE Journal on Selected Areas in Communications*, vol. 18, no. 10, pp. 1810-1824, October 2000.

[2] O. Aboul-Magd, et al, "Automatic Switched Optical Network (ASON) Architecture and Its Related Protocols", *IETF Internet Draft*, draft-ietf-ipo-ason-00.txt, July 2001.

[3] W. D. Grover, "Self-organizing Broad-band Transport Networks", *Proceedings of the IEEE*, vol. 85, no. 10, pp. 1582-1611, Oct. 1997.

[4] Global Crossing: http://www.globalcrossing.com/network.html

[5] 360 Networks: http://www.360networks.com/Our_Networks.asp

[6] Level3: http://www.level3.com/us/info/investor/network-map

[7] Genuity: http://www.genuity.com/infrastructure/maps.htm

[8] NetRail: http://www.netrail.com/htm/network.htm

[9] WorldCom: http://www.worldcom.com/about the company/fiber_network_maps/

[10] Williams Communications:http://www.wcg.com/network/map/index.html

[11] A. Lardies, A. Aguilar, "Planning Methodology for SDH+Optical Networks", *Proc. First Int. Workshop on the Design of Reliable Communication Networks (DRCN 1998)*, Belgium, 1998.

[12] B. Van Caenegem, W. Van Parys, F. De Turck, P. M. Demeester "Dimensioning of Survivable WDM Networks", *IEEE Journal on Selected Areas in Communications*, vol. 16, no. 7, pp. 1146-1157, September 1998.

[13] R. Bhandari, *Survivable Networks: Algorithms for Diverse Routing*, Kluwer Academic Publishers, November 1998.

[14] M. Clouqueur, W. D. Grover, "Computational and Design Studies on the Unavailability of Mesh-restorable Networks", Proc. $2^{nd}$ *Int. Workshop on the Design of Reliable Communication Networks* (DRCN 2000), Munich, Germany, pp. 181-186, April 2000.

[15] T. S. Wu, *Fiber Network Service Survivability*, Artech House, 1992.

[16] M. W. Maeda, "Management and Control of Transparent Optical Networks", *IEEE Journal on Selected Areas in Communications*, vol. 16, no. 7, pp. 1005-1023, September 1998.

[17] H. Sakauchi, Y. Nishimura, S. Hasegawa, "A Self-Healing Network with an Economical Spare Channel Assignment", Proc. *IEEE Global Telecommunications Conf (GlobeCom'90)*, 1990.

[18] W. D. Grover, "Distributed Restoration of the Transport Network", *Network Management into the 21st Century*, editors T. Plevyak, S. Aidarous, IEEE/IEE Press co-publication, ISBN 0-7803-1013-6, Chapter 11, pp. 337-417, February 1994.

[19] W. D. Grover, T. D. Bilodeau, B. D. Venables, "Near Optimal Spare Capacity Planning in a Mesh Restorable Network", *Proc. IEEE Global Telecommunications Conf. (GlobeCom'91)*, pp. 2007-2012, 1991.

[20] M. Herzberg, S. J. Bye, A. Utano, "The hop-limit approach for spare-capacity assignment in survivable networks", *IEEE/ACM Trans. On Networking*, vol. 3, no. 6, pp. 775-784, December 1995.

[21] Y. Xiong, L. G. Mason, "Restoration strategies and spare capacity requirements in self-healing ATM networks", *IEEE/ACM Trans. on Networking*, vol. 7 no. 1, pp. 98-110, February 1999.

[22] R. R. Iraschko, M. H. MacGregor, W. D. Grover, "Optimal Capacity Placement for Path Restoration in STM or ATM Mesh-Survivable Networks", *IEEE/ACM Transactions on Networking*, vol. 6, no. 3, pp. 325-336, June 1998.

[23] Y. Zheng, W. D. Grover, M. H. MacGregor, "Broadband Network Design with Controlled Exploitation of Flow-Convergence Overloads in ATM VP-Based Restoration", in *Proc. Can. Conf. on Broadband Research (CCBR'97)*, Ottawa, pp. 172-183, Apr. 16-17, 1997.

[24] R. D. Doverspike, B. Wilson, "Comparison of capacity efficiency of DCS network restoration routing techniques", *J. Networks and System Management*, vol. 2, no. 2, pp. 95-123, 1994.

[25] J. Doucette, W. D. Grover, "Influence of Modularity and Economy-of-scale Effects on Design of Mesh-Restorable DWDM Networks", *IEEE Journal on Selected Areas in Communications*, vol. 18, no. 10, pp. 1912-1923, October 2000.

[26] W. D. Grover, J. Doucette, "Increasing the Efficiency of Span-restorable Mesh Networks on Low-connectivity Graphs", *Proc. 3rd International Workshop on the Design of Reliable Communication Networks (DRCN2001)*, Budapest, Hungary, October 2001, (8 ms).

[27] J. Doucette, W. D. Grover, "Comparison of Mesh Protection and Restoration Schemes and the Dependency on Graph Connectivity", *Proc. 3rd International Workshop on the Design of Reliable Communication Networks (DRCN 2001)*, Budapest, Hungary, October 2001, (8 ms).

[28] E. Modiano, P. J. Lin, "Traffic Grooming in WDM Networks", *IEEE Communications Magazine*, vol. 39, no. 7, pp. 124-129, July 2001.

[29] W. D. Grover, Y. Zheng, "VP-Based Network Design with Controlled Over-Subscription of Restoration Capacity", *Proc. of First Int. Workshop on the Design of Reliable Communication Networks (DRCN 1998)*, Brugge, Belgium, 033, May 1998.

[30] R. Kawamura, K. Sato, I. Tokizawa, "Self-healing ATM networks based on virtual path concept", *IEEE J. on Selected Areas in Comm.*, Vol. 12, No. 1, pp. 120-127, January 1994.

[31] S. Kini, M. Kodialam, T. V. Laksham, C. Villamizar, "Shared backup Label Switched Path restoration", *IETF Internet Draft*, draft-kini-restoration-shared-backup-00.txt, November 2000.

[32] R. R. Iraschko, W. D. Grover, "A Highly Efficient Path-Restoration Protocol for Management of Optical Network Transport Integrity", *IEEE Journal on Selected Areas in Communications*, vol. 18, no. 5, pp. 779-793, May 2000.

[33] C. Wynants, *Network Synthesis Problems*, Kluwer Academic Publishers, Appendix A, 2001.

[34] A. Lardies, A. Aguilar, "Planning Methodology for SDH+Optical Networks", Proc. *First Int. Workshop on the Design of Reliable Comm. Networks (DRCN 1998)*, Brugge, Belgium, 1998.

[35] M. Bettin, G. Ferraris, G. Pignari, "Comparison of Protection and Restoration Schemes for SDH Networks", Proc. *First Int. Workshop on the Design of Reliable Comm. Networks(DRCN 1998)*, Brugge, Belgium, 1998.

[36] J. Ballintine, "A Proposal Implementation for a Digital 'Wrapper' for OCh Overhead," *ANSI T1 X1.5/99-003*, http://www.t1.org/index/0816.htm, January 1999.

We claim:

1. A method of restoring a telecommunications network, in which the telecommunications network includes plural nodes terminating plural spans, the plural nodes including nodes of degree two and nodes of at least degree three, the method comprising the steps of:

accumulating a set of working capacity values ($w_{tot}$) resulting from routing demands between a first node of at least degree three and a second node of at least degree three, the first node and second node being connected through a chain of nodes including at least a third node; wherein local flow values ($w_{loc}$) are intra-chain working capacity totals between the first and third nodes and the third and second nodes and that arise from demands that originate or terminate at one of the nodes of the chain, and with $w_{loc}$ values given, a difference remaining being express flow ($w_{exp}$) accumulations of demands between the first and third nodes and the third and second nodes and that flow entirely through the chain of nodes but do not originate or terminate at any node of the chains of nodes;

detecting a span failure between the first node and the second node; and treating the restoration of local flows and express flows differently by:

A) looping back local flows from the third node to the first node; and

B) failing back express flows from the third node to the first node and routing express flows failed back from the third node to the first node onto spans with spare capacity other than spans between nodes in the chain of nodes, wherein an amount of sparing on a chain is determined by the $w_{loc}$ having a largest value.

2. The method of claim 1 in which the telecommunications network is configured with cross-connect equipment at nodes having degree three or more and add-drop multiplexing equipment at nodes having degree two.

3. A method of restoring a telecommunications network, in which the telecommunications network includes plural nodes terminating plural spans, the plural nodes including nodes of degree two and nodes of at least degree three, the method comprising the steps of:

accumulating a set of working capacity values ($w_{Tot}$) resulting from routing demands between a first node of at least degree three and a second node of at least degree three, the first node and second node being connected through a chain of nodes including at least a third node of degree two; wherein local flow values ($w_{loc}$) are intra-chain working capacity totals between the first and third nodes and the third and second nodes and that arise from demands that originate or terminate at one of the nodes of the chain, and with $w_{loc}$ values given, a difference remaining being express flow ($w_{exp}$) accumulations of demands between the first and third nodes and the third and second nodes and that flow entirely through the chain of nodes but do not originate or terminate at any node of the chain of nodes;

detecting a span failure between the first node and the second node; and treating the restoration of local flows and express flows differently by:

A) looping back local flows from the third node to the first node; and

B) failing back express flows from the third node to the first node and routing express flows failed back from the third node to the first node onto spans with spare capacity other than spans between nodes in the chain of nodes, wherein an amount of sparing on a chain is determined by the $w_{loc}$ having a largest value.

4. The method of claim 3 in which the telecommunications network is configured with cross-connect equipment at nodes having degree three or more and add-drop multiplexing equipment at nodes having degree two.

5. A method of planning telecommunication network capacity to accommodate span failures, the method comprising the steps of:

A) calculating required spare capacity in the telecommunications network taking into account the restoration of express flows according to the method comprising the steps of accumulating a set of working capacity values ($w_{tot}$) resulting from routing demands between a first node of at least degree three and a second node of at least degree three with the first node and second node being connected through a chain of nodes including at least a third node, wherein local flow values ($w_{loc}$) are intra-chain working capacity totals between the first and third nodes and the third and second nodes and that arise from demands that originate or terminate at one of the nodes of the chain, and with $w_{loc}$ values given, a difference remaining being express flow ($w_{exp}$) accumulations of demands between the first and third nodes and third and second nodes and that flow entirely through the chain of nodes but do not originate or terminate at any node of the chain of nodes, detecting a span failure between the first node and the second node, treating the restoration of local flows and express flows differently by looping back local flows from the third node to the first node, and failing back express flows from the third node to the first node and routing express flows failed back from the third node to the first node onto spans with spare capacity other than spans between nodes in the chain of nodes, wherein an amount of sparing on a chain is determined by the $w_{loc}$ having a largest value; and B) allocating spare capacity in the telecommunications network according to the calculation of step A.

6. The method of claim 5 in which the telecommunications network is configured with cross-connect equipment at nodes having degree three or more and add-drop multiplexing equipment at nodes having degree two.

7. A telecommunications network having spare capacity distributed according to the method of claim 5.

8. A method of restoring a telecommunications network, in which the telecommunications network includes plural nodes terminating plural spans, the plural nodes including nodes of degree two and nodes of at least degree three, the method comprising the steps of:

accumulating a set of working capacity values ($w_{tot}$) resulting from routing demands between a first node of at least degree three and a second node of at least degree three, the first node and second node being connected through a chain of nodes including at least a third node; wherein local flow values ($w_{loc}$) are intra-chain working capacity totals between the first and third nodes and the third and second nodes and that arise from demands that originate or terminate at one of the nodes of the chain, and with $w_{loc}$ values given, a difference remaining being express flow ($w_{exp}$) accumulations of demands between the first and the third nodes and the third and second nodes and that flow entirely through the chain of nodes but do not originate or terminate at any node of the chain of nodes;

detecting a span failure between the first node and the second node; and treating the restoration of local flows and express flows differently by:

A) looping back local flows from the third node to the first node; and

B) rerouting, from the first node, express flows flowing through the first node and thence through the second node onto spans with spare capacity other than spans between nodes in the chain of nodes without looping back all the rerouted express flows through nodes in the chain of nodes, wherein an amount of sparing on a chain is determined by the $w_{loc}$ having a largest value.

9. The method of claim 8 in which the telecommunications network is configured with cross-connect equipment at nodes having degree three or more and add-drop multiplexing equipment at nodes having degree two.

10. A method of restoring a telecommunications network, in which the telecommunications network includes plural nodes terminating plural spans, the plural nodes including nodes of degree two and nodes of at least degree three, the method comprising the steps of:

accumulating a set of working capacity values ($w_{tot}$) resulting from routing demands between a first node of at least degree three and a second node of at least degree three, the first node and second node being connected through a chain of nodes including at least a third node of degree two; wherein local flow values ($w_{loc}$) are intra-chain working capacity totals between the first and third nodes and the third and second nodes and that arise from demands that originate or terminate at one of the nodes of the chain, and with $w_{loc}$ values given, a difference remaining being express flow ($w_{exp}$) accumulations of demands between the first and third nodes and the third and second nodes and that flow entirely through the chain of nodes but do not originate or terminate at any node of the chain of nodes;

detecting a span failure between the first node and the second node; and treating the restoration of local flows and express flows differently by:

A) looping back local flows from the third node to the first node; and

B) rerouting, from the first node, express flows flowing through the first node and thence through the second node onto spans with spare capacity other than spans between nodes in the chain of nodes without looping back all the rerouted express flows through nodes in the chain of nodes, wherein an amount of sparing on a chain is determined by the $w_{loc}$ having a largest value.

11. The method of claim 10 in which the telecommunications network is configured with cross-connect equipment at nodes having degree three or more and add-drop multiplexing equipment at nodes having degree two.

12. A method of planning telecommunication network capacity to accommodate span failures, the method comprising the steps of:

A) calculating required spare capacity in the telecommunications network taking into account the restoration of express flows according to the method comprising the steps of accumulating a set of working capacity values ($w_{tot}$) resulting from routing demands between a first node of at least degree three and a second node of at least degree three with the first node and second node being connected through a chain of nodes including at least a third node, wherein local flow values ($w_{loc}$) are intra-chain working capacity totals between the first and third nodes and the third and second nodes and that arise from demands that originate or terminate at one of the nodes of the chain, and with $w_{loc}$ values given, a difference remaining being express flow ($w_{exp}$) accumulations of demands between the first and third nodes and the third and second nodes and that flow entirely through the chain of nodes but do not originate or terminate at any node of the chain of nodes, detecting a span failure between the first node and the second node, treating the restoration of local flows and express flows differently by looping back local flows from the third node to the first node, and rerouting, from the first node, express flows flowing through the first node and thence through the second node onto spans with spare capacity other than spans between nodes in the chain of nodes without looping back all the rerouted express flows through nodes in the chain of nodes, wherein an amount of sparing on a chain is determined by the $w_{loc}$ having a largest value; and B) allocating spare capacity in the telecommunications network according to the calculation of step A.

13. The method of claim 12 in which the telecommunications network is configured with cross-connect equipment at nodes having degree three or more and add-drop multiplexing equipment at nodes having degree two.

14. A telecommunications network having spare capacity distributed according to the method of claim 12.

* * * * *

UNITED STATES PATENT AND TRADEMARK OFFICE
CERTIFICATE OF CORRECTION

PATENT NO. : 7,719,962 B2  
APPLICATION NO. : 10/000715  
DATED : May 18, 2010  
INVENTOR(S) : W. D. Grover et al.

Page 1 of 1

It is certified that error appears in the above-identified patent and that said Letters Patent is hereby corrected as shown below:

| COLUMN | LINE | ERROR |
|---|---|---|
| 22 (Claim 3, line 6) | 25 | "($w_{Tot}$)" should read --($w_{tot}$)-- |
| 23 (Claim 8, line 6) | 34 | "($w_{tot}$)resulting" should read --($w_{tot}$) resulting-- |

Signed and Sealed this

Thirty-first Day of August, 2010

David J. Kappos
*Director of the United States Patent and Trademark Office*